Sept. 14, 1948.  P. B. MILLER  2,449,243
SELF-ALIGNING PUMP FLANGE
Filed Oct. 10, 1944
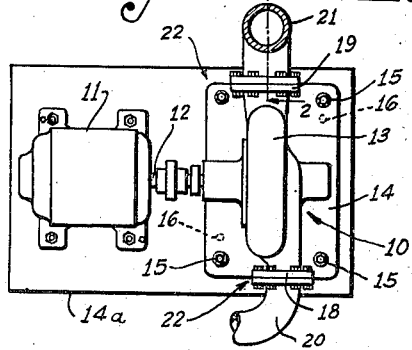
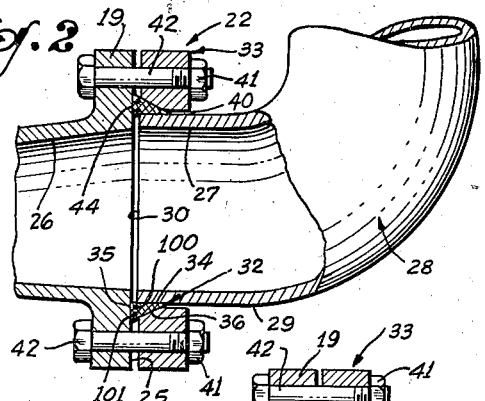
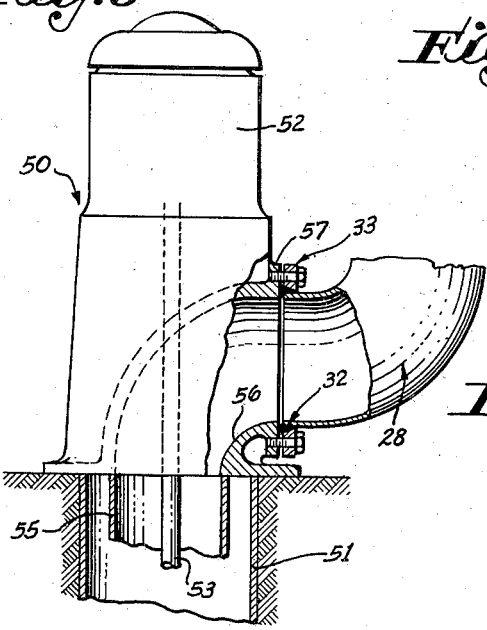
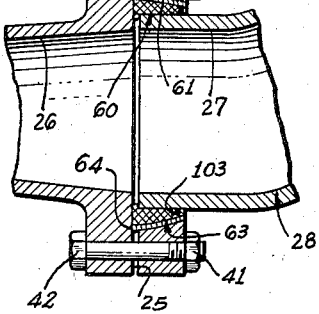
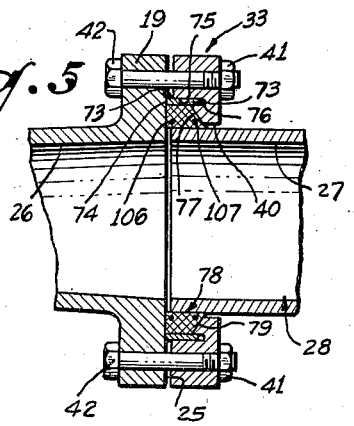
INVENTOR
PAUL BURT MILLER
BY HARRIS, KIECH, FOSTER & HARRIS
FOR THE FIRM
ATTORNEYS Patented Sept. 14, 1948

2,449,243

UNITED STATES PATENT OFFICE 2,449,243

SELF-ALIGNING PUMP FLANGE

Paul Burt Miller, Los Angeles, Calif., assignor to Pacific Pumps, Inc., Huntington Park, Calif., a corporation of California Application October 10, 1944, Serial No. 557,952

9 Claims. (Cl. 285—135)

My invention relates to a self-aligning pump flange and to a novel flexible connection between a pipe and a flange.

In installing centrifugal pumps of the horizontal shaft type, it is a conventional practice to connect the inlet and discharge pipes to corresponding inlet and discharge flanges of the pump. These flanges are usually cast integrally with the pump housing. The intake and discharge pipes usually carry pipe flanges which are bolted to the pump flanges. If the flanges are slightly misaligned, tightening of the bolts will cause a tendency for the pump elements to become disaligned and the pump housing to be disaligned with respect to the prime mover, with the result that critical alignments are destroyed, producing undue friction and early failure of parts. The same disalignments often arise from expansive or other movement of the inlet and discharge pipes after being connected to the pump. Similar problems arise in the connecting of the discharge pipe to the pump head of a deep well centrifugal pump.

To cure such difficulties, it has been proposed to connect the pipe to the pump by use of a flexible coupling. A typical widely used coupling includes a pipe flange bolted to the pump flange and internally threaded to receive a short pipe nipple. The main section of the pipe is spaced from the end of this nipple and a fluid-tight seal is effected by use of a sleeve telescoping with the nipple and the pipe and having flared ends, each receiving an annular sealing ring. The sealing rings are moved into their flared cavities by suitable glands, the glands being moved toward each other by bolts disposed around the sleeve. In addition, where pressures above 50 lbs./sq. in. are encountered, it is necessary to employ an auxiliary connection between the pipe nipple and the main pipe to prevent withdrawal from the sleeve, usually tie rods including turn-buckles and connected by clamps to the pipe and nipple.

Such pipe couplings are not only expensive but are very disadvantageous in those instances where space considerations are important. It is often desirable to employ a pipe turn, elbow, or bent pipe immediately beyond the pump flange, particularly in those instances where the incoming or discharged liquid must be deflected sharply into or from the pump in view of limited space, yet this is impossible with the usual flexible coupling, the sleeve of which is at least 6-8" long and which requires use of a straight section of pipe or nipple at least 12" long to permit coupling and uncoupling.

It is an object of the present invention to provide a flexible coupling occupying a minimum of space and permitting a sharply-bent pipe, pipe turn, etc., to be connected directly to a pump flange.

Another object of the invention is to provide a novel flexible joint for connecting a pipe to a standard flange, without the necessity of expensive machining of the flange.

A further object is to provide a novel connection between a pipe and a pump which will not transmit bending moments from the pipe to the pump to disalign the pump and the prime mover or to disalign the pump elements.

A further object is to provide a novel sealing means between a pipe and a flange which increases its sealing action as the pipe tends to be drawn away from the flange, which is extremely simple and which effects large savings in cost in the manufacture and installation of piping.

The invention is not limited to use in combination with a pump but is applicable to the joining of pipe to various flanges of standard construction. It is applicable also to the flexible joining of two lengths of pipe, particularly if one length is flanged. The provision of novel structures for such purposes is within the objects of the present invention.

Other objects and advantages of the invention will be evident from the following description of exemplary embodiments.

Referring to the drawing:

Figure 1 is a diagrammatic top view of a centrifugal pump incorporating the invention;

Figure 2 is a sectional view of one embodiment of the invention, taken along the line 2—2 of Figure 1;

Figure 3 is an outline view, partially in section, of a pump head for a deep well pump incorporating the invention; and Figures 4 and 5 are sectional views similar to Figure 2 showing alternative forms of the invention.

The problem noted above is exemplified with reference to the horizontal centrifugal pump 10 shown in Figure 1, this pump being driven by an electric motor 11 through a suitable drive connection 12. Pumps of this type usually include a housing or casing 13 in which one or more impellers rotate. This housing or casing 13 is suitably connected to a foot plate 14 secured to a cast iron or structural steel base 14a by bolts 15. Dowels 16, extending into the base 14a, are often used to aid in maintaining alignment between the pump and the motor 11, the latter being also bolted and doweled to the base 14a in conventional practice. Even with such rigid base connections, however, stresses transmitted to the pump casing from the inlet and discharge piping often tend to produce the above-noted disalignment.

The pump in Figure 1 includes an inlet flange 18 and a discharge flange 19, each respectively connected to an intake pipe 20 and a discharge pipe 21 by employment of flexible joints 22 of the invention. Space considerations often dictate the necessity of sharp turns in the intake and discharge piping close to the pump flanges 18 or 19, and Figure 1 indicates the pipes 20 and 21 as turning sharply close to the respective pump flanges.

It is a feature of the present invention that standard flanges, 18 and 19 for example, can be employed. Thus, in Figure 2, the pump flange 19 is shown as a standard flange including a flat attachment surface 25 which may be a machined surface or, if desired, a rough surface resulting from casting of the flange integrally with the casing 13. The flange 19 provides a passage 26, shown as aligned with a passage 27 of a pipe, indicated generally by the numeral 28 and shown as comprising a pipe turn 29 having a forward end 30 disposed in close proximity to the attachment surface 25. Before moving the pipe turn 29 into this position, a sealing ring 32 and a collar 33 are disposed around the pipe.

The sealing ring 32 is formed of deformable material and is preferably a one-piece annular ring, substantially triangular in cross section in the embodiment of Figure 2. It provides an inner cylindrical surface 34 of a diameter capable of being slipped over the end of the pipe 28 to engage the peripheral surface thereof. It provides also a substantially radial surface 35, usually extending substantially at right angles to the inner cylindrical surface 34 and adapted to lie in surface contact with the attachment surface 25. Finally, the sealing ring 32 provides a sloping annular surface 36, converging inwardly toward the axis of the end of the pipe 28 in a direction away from the end. In the embodiment of Figure 2, the sloping annular surface 36 is conical although, if desired, it may be curved when viewed in section so long as it is of a shape converging inwardly away from the pump flange 19.

The collar 33 is shown as an annular one-piece ring providing an inner opening 40 sufficiently larger in diameter than the exterior of the pipe 28 to be movable therealong and permit some relative turning movement between the pipe and collar. This collar provides means for compressing the sealing ring 32 around the pipe and against the attachment surface 25 upon movement of the collar toward the attachment surface, as by tightening nuts 41 connected to bolts 42 extending through the flange 19 and the collar 33. To accomplish this, the collar 33 provides a cavity 44 receiving at least a portion of the sealing ring 32. In the embodiment of Figure 2, this cavity provides a tapered wall corresponding generally in shape to the sloping annular surface 36 of the sealing ring 32, e. g., a substantially frusto-conical wall in the embodiment of Figure 2. Upon tightening the nuts 41, forces are imparted to the sealing ring 32, tending to compress it tightly around the periphery of the pipe 28 and to press it tightly against the attachment surface 25 to form an effective seal even though the end 30 of the pipe turn 29 is not in surface contact with the attachment surface 25. The end 30 should be sufficiently close to the attachment surface to prevent excessive flow of the ring material into the intervening space. The permissible maximum spacing depends upon the material of which the sealing ring is formed, the pressures to be sealed against, etc. However, in general, spacings up to a quarter of an inch or more can usually be accommodated.

The inner opening 40 is sufficiently larger than the periphery of the pipe to permit slight flexing of the pipe with respect to the collar 33. During such flexing, one peripheral portion of the end 30 may come closer to the attachment surface 25 than a diametrically opposed portion but the compressed sealing ring accommodates such movement while maintaining an effective seal. Such movement of the pipe 28, accommodated by the sealing ring 32, is thus not transmitted to the flange 19 and the disalignment tendencies noted above are thereby eliminated. At the same time, the pipe 28 can be turned sharply close to the flange 19, as distinguished from prior constructions in which a relatively long length of pipe must intervene to give space for a conventional flexible coupling.

It should be noted also that the sealing action of the flexible joint shown in Figure 2 increases with increased hydraulic pressure in the pipe 28, tending to move the pipe turn 29 leftward and out of the collar 33. Such hydraulic forces applied to the pipe turn tend to increase the sealing action between the periphery of the pipe turn and the sealing ring 32 in view of the tapered nature of the ring. In practice, flexible joints of this type have been tested at pressures in excess of 100 lbs./sq. in., the sealing action being maintained without auxiliary clamps between the pipe and the pump flange 19, the test conditions being such that use of the conventional flexible joint noted above would have required auxiliary clamping means between the nipple and the pipe to prevent separation and destruction of the sealing action. The type of flexible seal shown in Figure 2 can readily be designed to seal effectively a pressure of 100 lbs./sq. in. or more, up to a total thrust of 5000 pounds or more applied to the pipe turn.

In pumps designed for pressuring water at relatively low temperature, the sealing ring 32 may be formed of natural or synthetic rubber. Synthetic rubber is preferred also in the pumping of fluids such as gasoline. In either instance, however, the sealing ring can be formed of other ductile material, such as a relatively soft metal deformable to some extent under pressure, e. g., lead or various alloys, preferably non-corrosive with respect to the pumped liquid. When pumping high-temperature liquids at low or high pressures, the sealing ring 32 is formed of a material capable of withstanding the temperatures involved, e. g., it may be formed of an alloy such as Monel metal or other relatively soft and compressible metal sufficiently ductile to form an effective seal around the periphery of the pipe, even though this periphery is not machined smooth, and against the attachment surface 25, even if not machined. While a peripherally-unitary sealing ring 32 is desired, it should be understood that a split-type ring can be employed, particularly if the ring is split at an angle rather than parallel to its central axis, e. g., to provide surfaces disposed helically with respect to the central axis so that they come into surface contact with each other when the collar 33 is forced into position.

In Figure 3 is shown the adaption of the flexible sealing arrangement of Figure 2 with the pump head of a deep well centrifugal pump. The showing is diagrammatic but indicates generally a pump head 50 disposed above a well cavity having a casing 51. A motor 52 turns a drive shaft 53 which is connected to the usual impellers of a centrifugal pump submerged in the well liquid. The pumped liquid moves upward through a pump tubing 55 and discharges through elbow 56 providing a pump flange 57 corresponding to the pump flange 19 of Figure 2. The pipe 28 and the sealing arrangement are as described with reference to Figure 2. Here again, any disalignment prior to or after connection of the pipe 28 is prevented by the flexible joint, and the pipe can be turned sharply from the joint as previously described.

Figure 4 shows an alternative construction in which the sealing ring, here indicated by the numeral 60, extends substantially completely through the collar 33. In this embodiment, the cavity of the collar is bounded by a tapered wall 61 which is curved in section and which may, for example, be frusto-spherical, converging inwardly away from the flange 19. This configuration can also be used as to the cavity wall of Figure 2 without departing from the spirit of the invention.

In the embodiment of Figure 4, a ring-confining element 63 is disposed between the outer periphery of the sealing ring 60 and the tapered wall 61. This ring-confining element provides a forward edge 64 engaging the attachment surface 25 of the flange 19, and thus confining outward expansion of the sealing ring 60 completely to the attachment surface. In addition, the engagement between the forward edge 64 of the ring-confining element 63 and the attachment surface 25 insures relative sliding movement between the outer periphery of this element and the tapered wall 61 when the nuts 41 are tightened, thus tending to avoid shearing strains on the sealing ring 60 during tightening of the joint. The ring-confining element 63 is preferably formed so as to be collapsible without peripheral rippling when the nuts 41 are tightened. This can be accomplished by making the element of thin deformable material, such as brass, lead, copper, aluminum, etc. Usually, the hardness and ductility of the material forming this ring-confining element are intermediate in hardness and ductility between the material forming the sealing ring 60 and the collar 33.

In the alternative embodiment shown in Figure 5, the ring-confining element is indicated by the numeral 73 and provides a forward edge 74 engaging the attachment surface 25 of the flange 19. The rear portion of this cylindrical ring-confining element 73 extends slidably into an annular channel 75 of the collar 33, this channel being of sufficient depth to provide an unoccupied space 76 at the rear end of the ring-confining element so as not to restrict movement of the collar 33 toward the flange 19 when the nuts 41 are tightened. In this embodiment, the tapered wall of the collar 33 is indicated by the numeral 77, being frusto-conical and converging rearwardly or away from the flange 19. As in Figure 2, the inner opening 40 of the collar 33 is sufficiently larger than the pipe periphery to permit some degree of relative movement. The sealing ring in the embodiment of Figure 5 is indicated by the numeral 78 and provides a sloping annular surface 79 engaging the tapered wall 77 bounding the cavity of the collar 33. When installed, the sealing ring 78 will have a cross section substantially trapezoidal in shape. Tightening of the nuts 41 will compress the forward surface of the ring 78 against the attachment surface 25 of the flange 19. At the same time, the sealing ring will be compressed around the periphery of the pipe and this ring will be prevented from outward movement between the collar 33 and the flange 19 by the presence of the ring-confining element 73.

In all of the embodiments, it should be understood that the sealing ring is preferably formed of cross-sectional shape similar to its cross section in compressed position, as shown in Figures 2, 4, and 5, respectively. However, this is not essential to the invention, particularly if rubber or other readily-deformable material is used in forming the sealing ring, as the ring will be compressed into its illustrated form by tightening of the nuts 41. Also, in each of the embodiments, it is sometimes desirable, though not essential, to embed in the sealing ring 32 one or more reinforcing rings disposed within the sealing ring at any of the positions where two faces of the sealing ring meet angularly. For example, Figure 2 shows an annular reinforcing ring 100 embedded in the sealing ring 32 close to the junction of the internal cylindrical surface 34 and the radial portion or surface 35, and tends to restrict excessive compression of the material of the sealing ring into any peripheral space between the end 30 of the pipe and the attachment surface 25. A similar reinforcing ring 101 is embedded in the sealing ring near the apex of the acute angle between the radial portion 35 and the sloping annular portion 36. A similar reinforcing ring 103 is shown in Figure 4 as embedded near the rear end of the sealing ring. Figure 5 shows a reinforcing ring 106 corresponding in position to the ring 100 of Figure 2, and another reinforcing ring 107 near the toe of the trapezoidal section, similar to the ring 103 of Figure 4. In all instances, these rings can be embedded during forming of the sealing ring. They may comprise a closed loop of wire with ends either connected or separate. Alternatively, such wire may be bent helically into spring-like form, the longitudinal axis of the helix surrounding the pipe 28, the reinforcing element being then of a doughnut-like shape.

The invention has many advantages over formerly-used types of flexible couplings, for example the sleeved coupling previously mentioned. Thus, it is capable of sealing substantially higher internal pressures without necessitating auxiliary clamping means between the pipe and the flange or between the pipe and a nipple threaded to the flange. Furthermore, an increase in internal pressure tends to increase the sealing action due to the tapered peripheral walls of the sealing ring. Very substantial savings in machining costs are involved as the invention can be used with standard flanges, it being unnecessary to groove these flanges or even to machine the attachment surface 25. Use of the invention eliminates many of the parts of the previously mentioned flexible coupling of conventional design, requires no threading of any pipe section, and eliminates the pipe nipple, the sleeve, one seal, and the gland interconnection previously mentioned, not to mention miscellaneous items, such as auxiliary tie rods, bolts, nuts, etc. It also results in a very substantial saving in space and makes possible the turning of a pipe close to the flange while still providing flexibility and preventing transfer of pipe stresses to the flange or its connected structure, such as the housing of a pump.

Various changes and modifications can be made without departing from the spirit of the invention as defined in the appended claims.

I claim as my invention:

1. In a device for flexibly connecting a pipe to a pump flange to prevent disalignment due to forces transmitted to the pump from the pipe and to permit attachment of a pipe turning sharply close to the flange, said pipe providing an end adjacent a flat attachment surface of said pump flange, said device including in combination: a sealing ring formed of deformable material surrounding said pipe at said end and providing an inner cylindrical surface adapted to surround and engage the periphery of said pipe immediately adjacent said end and providing an outwardly-extending surface adapted to engage said attachment surface of said pump flange; and clamp means movable with respect to said pipe and said pump flange for simultaneously compressing said sealing ring in sealing engagement with said periphery of said pipe and said attachment surface of said pump flange.

2. A combination as defined in claim 1, in which at least a portion of the periphery of said end of said pipe is spaced a slight distance from said attachment surface to leave a peripheral space, and in which said sealing ring extends slightly beyond said end of said pipe to seal said peripheral space.

3. In a device for flexibly connecting a pipe to a pump flange to prevent disalignment due to forces transmitted to the pump from the pipe and to permit attachment of a pipe turning sharply close to the flange, said pipe providing an end adjacent a single flat substantially radial attachment surface of said pump flange, said device including in combination: a sealing ring formed of deformable material surrounding said pipe at said end and providing an inner cylindrical surface adapted to engage the periphery of said pipe immediately adjacent said end, a substantially radial surface adapted to engage said attachment surface of said pump flange and a sloping annular surface converging inwardly toward the axis of said end of said pipe in a direction away from said end; and a movable collar surrounding said pipe at a section adjacent said end and providing a cavity for receiving at least a portion of said sealing ring, said collar providing means for compressing said ring around said pipe and against said attachment surface of said flange upon movement of said collar toward said attachment surface.

4. A combination as in claim 3 wherein said movable collar is provided with a central opening adapted to receive said end of said pipe and being slightly larger in diameter than the diameter of said pipe whereby to permit a limited amount of angular movement of the pipe with respect to the axis of said pump flange to care for slight misalignment without destroying the sealing action of the device, said collar being relatively short to permit corresponding tipping action of said end of said pipe in said central opening without destroying said sealing action, said end of said pipe being slightly spaced from said flat radial attachment surface, and said means provided by said collar including means for securing said collar to said pump flange.

5. A combination as in claim 4 wherein said deformable sealing ring is substantially triangular in cross-section thereby providing three annular surfaces one of which three surfaces constitutes said radial surface of said ring to engage said radial attachment surface of said pump flange, another of which three surfaces constitutes said inner cylindrical surface to engage the periphery of said pipe, and the third of which three surfaces is said sloping converging surface and is a continuously sloping surface angularly disposed with respect to said pipe end, said collar having a corresponding inner continuously sloping annular surface to engage said continuously sloping surface of said sealing ring, whereby said collar compresses said sealing ring by reason of said continuously sloping surface against said periphery of said pipe and against said flat radial attachment surface of said pump flange, and whereby internal pressure within said pipe tends to compress said sealing ring against said sloping annular surface of said collar.

6. A combination as defined in claim 3, in which said means includes an annular wall bounding said cavity and a ring-confining element in contact with said annular wall on one side and in contact with said sealing ring on the other side.

7. A combination as defined in claim 3, in which said means includes an annular wall bounding said cavity and a ring-confining element in contact with said annular wall on one side and in contact with said sealing ring on the other side, said ring-confining element engaging said attachment surface of said flange and said collar being movable with respect to said ring-confining element when said collar is moved toward said attachment surface.

8. In a device for flexibly sealing the end of a pipe to an outwardly-extending single flat radial attachment surface: a collar loosely surrounding said pipe, said collar providing a cavity bounded by a tapered wall converging in a direction away from said attachment surface, the periphery of said pipe forming another boundary wall of said cavity, said cavity opening on said attachment surface; a sealing ring in said cavity, said ring being approximately triangular in cross-section and providing a flat annular face at one end to engage said flat radial attachment surface; and means for moving said collar toward said attachment surface to compress said sealing ring in said cavity and press same against the periphery of said pipe and against said attachment surface.

9. A combination as defined in claim 8, including a ring-confining element providing a forward edge engaging said attachment surface and movable with respect to said collar to confine the material of said sealing ring against outward movement between said collar and said attachment surface.

PAUL BURT MILLER.

REFERENCES CITED

The following references are of record in the file of this patent:

UNITED STATES PATENTS

| Number | Name | Date |
|---|---|---|
| 802,076 | Hindsdale | Oct. 17, 1905 |
| 1,112,760 | Boosey | Oct. 6, 1914 |
| 2,247,031 | Morton | June 24, 1941 |

FOREIGN PATENTS

| Number | Country | Date |
|---|---|---|
| 1,162 | Great Britain | Jan. 19, 1893 |
| 1,236 | Austria | 1900 |